(12) United States Patent
Shoda et al.

(10) Patent No.: US 6,870,704 B2
(45) Date of Patent: Mar. 22, 2005

(54) MAGNETIC DISC APPARATUS AND ITS FABRICATING METHOD

(75) Inventors: Mitsuhiro Shoda, Odawara (JP); Hiroshi Tani, Ninomiya (JP); Hiroyuki Matsumoto, Chigasaki (JP); Takayuki Nakakawaji, Kitaibaraki (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 160 days.

(21) Appl. No.: 10/073,291

(22) Filed: Feb. 13, 2002

(65) Prior Publication Data

US 2003/0067711 A1 Apr. 10, 2003

(30) Foreign Application Priority Data

Oct. 9, 2001 (JP) .......................................... 2001-311011

(51) Int. Cl.⁷ .............................................. G11B 17/02
(52) U.S. Cl. .................................................. 360/97.02
(58) Field of Search ............................ 360/97.02, 97.03

(56) References Cited

U.S. PATENT DOCUMENTS

| | | | | | |
|---|---|---|---|---|---|
| 4,789,913 | A | * | 12/1988 | Gregory et al. | 360/97.03 |
| 5,680,273 | A | * | 10/1997 | Wong | 360/97.02 |
| 5,909,337 | A | * | 6/1999 | Tyndall, III | 360/97.01 |

FOREIGN PATENT DOCUMENTS

| JP | 1-21557 | 4/1989 |
|---|---|---|
| JP | 7-82698 | 9/1995 |

* cited by examiner

*Primary Examiner*—Robert S. Tupper
(74) *Attorney, Agent, or Firm*—Mattingly, Stanger & Malur, P.C.

(57) ABSTRACT

A low cost and highly reliable lubricating technique is realized by using a lubricant having an average molecular weight in the range of 900 to 2500. The lubricant is efficiently supplied to inner portions of a magnetic disk apparatus utilizing heat generated during operation of the apparatus. The method of assembling the apparatus is not affected since it is not necessary to provide a separate lubricant supply mechanism.

13 Claims, 2 Drawing Sheets

MAGNETIC DISC APPARATUS AND ITS FABRICATING METHOD

BACKGROUND OF THE INVENTION

1. Field of the Invention

The present invention relates to a magnetic disc apparatus using a lubricant supply head-disc interface method that supplies lubricant to a magnetic disc platter from a specific lubricant supply source. Particularly, it relates to a lubricant whose average molecular weight measures in a specific range in order to obtain high reliability for a long period of time using inner portions of the apparatus as a lubricant supply source. It also relates to a fabricating method of the apparatus having the lubricant.

2. Description of the Related Art

A technique for supplying lubricant to a magnetic disc platter in a magnetic disc apparatus and for specially arranging a lubricant supply mechanism for supplying lubricant utilizing hot air in an apparatus on a base under a spindle is disclosed in Japanese published examined patent application No. Hei 1-21557. In such a case, the structure of the magnetic disc apparatus becomes complex and the method of assembling the apparatus becomes more complex, thereby increasing cost and deteriorating productivity.

A magnetic disc apparatus characterized in that lubricant of the same group as lubricant applied to a magnetic disc is applied to a bearing of an actuator, a guide rail or a bolt fastened part is also proposed in Japanese published examined patent application No. Hei 7-82698. Recently, with respect to lubricants applied on a magnetic disc, fluoric lubricant having an end functional group is used and is very expensive. When lubricant in the same group as lubricant applied to a magnetic disc is used for a mechanically worn part in a magnetic disc apparatus, a large quantity of lubricant is required and the increase in cost becomes unavoidable.

Also, in the above-mentioned two prior art references, the molecular weight of the lubricant, which is most important when considering a lubricant supply method, is not defined. Therefore, these references do not sufficiently disclose how to adequately secure high reliability, which is of utmost importance for a magnetic disc apparatus in the long term.

SUMMARY OF THE INVENTION

Ordinarily, the quantity of lubricant on a magnetic disc decreases with the increase in operation hours of an apparatus. The main reasons are the shearing force of air generated by the rotation of the magnetic disc, the scatter due to centrifugal force, evaporation due to the rise of temperature in an apparatus and being scratched by contact with a magnetic head. For the role of lubricant on the magnetic disc, it is needless to say to avoid the crush due to a direct touch to the magnetic head, however, as the lubricant reduces surface energy on the magnetic disc and possibly prevents a contamination in the apparatus from being absorbed, the stable flying of the magnetic head can be maintained. As the above-mentioned action of the lubricant is impaired when the lubricant having such a role decreases, reliability for storing data which is the most important for a magnetic disc apparatus is lost and it is a large problem.

Meanwhile, the working conditions of a magnetic disc apparatus vary. Particularly, a magnetic disc apparatus used in a portable terminal such as a notebook-sized personal computer is frequently turned on/off. Under such a working condition, the temperature inside the apparatus does not rise enough and lubricant hardly evaporates. Therefore, high reliability cannot be acquired in the above-mentioned prior art references. Also, there is a problem that failure is high in the beginning of operation even in a magnetic disc apparatus normally operated such as a magnetic disc apparatus mounted in RAID and a server and reliability against wearing before the temperature inside the apparatus rises is required.

Further, a magnetic disc apparatus is required to maintain initial performance for a long term. Thus, the magnetic disc apparatus is required to have a lubricant supply function for also supplying enough lubricant when time to some extent elapses.

To achieve the above-mentioned objects, the reduction of the cost and simple assembling means without complex structure are required to be realized.

The invention is made to solve the above-mentioned problems and the object is to provide a magnetic disc apparatus that can maintain initial performance for a long term since the beginning of the operation at a low cost.

To achieve this object, in the magnetic disc apparatus according to the invention having a system of supplying lubricant to a magnetic disc platter, at least any of the components in the apparatus whose temperature, while the magnetic disc apparatus is operated, is higher than the temperature of a cover or a base of the magnetic disc apparatus is coated with lubricant. The average molecular weight of the lubricant is in a range of 900 to 2500.

Further, it is desirable that the temperature while the magnetic disc apparatus is operated of the component in the apparatus coated with the lubricant is higher than the temperature of the cover or the base of the magnetic disc apparatus by 10 C.° or more.

Also, the surface of a read/write IC unit and the surface of a magnet of a voice coil motor (VCM) in the magnetic disc apparatus are coated with lubricant of low average molecular weight.

Furthermore, at least any of the surfaces substantially perpendicular to the data surface of the magnetic disc platter of components located outside the magnetic disc platter when it is viewed from the rotational center in the magnetic disc apparatus is coated with lubricant.

Also, the cover, the base, a pivot bearing and a tapped hole for screwing a spindle and others in the magnetic disc apparatus are coated with lubricant.

Further, the coated lubricant is perfluoropolyether lubricant shown in the following chemical formula (1).

$$CH_2OH\text{—}CF_2(OCF_2CF_2)_m\text{-}(OCF_2)_n\text{-}CH_2OH \text{ (m and n being natural numbers)} \quad \text{Chemical formula (1)}$$

Further, in a fabricating method of the magnetic disc apparatus of the system of supplying lubricant to the magnetic disc platter in the magnetic disc apparatus, a process for coating a components in the magnetic disc apparatus which is a supply source of lubricant with lubricant includes at least any of a lubricant dip coating process, a coating process using a brush and a sponge marker and a process for dropping lubricant via a tapped hole for attaching the cover of the magnetic disc apparatus to the base.

DETAILED DESCRIPTION OF THE PREFERRED EMBODIMENTS

The invention will be described based upon its embodiments below. Ordinarily, the average molecular weight of lubricant applied on a magnetic disc is in a range of 3000 to 6000. Lubricant used in the invention for applying on a magnetic disc is perfluoropolyether lubricant having a hydroxyl group at both ends and shown in the expression (1) and the average molecular weight is 2000. In the invention, for lubricant applied on a magnetic disc platter, the above-mentioned lubricant is also used.

For lubricant applied to a component in the magnetic disc apparatus for supplying onto a magnetic disc, that is, lubricant used for supply, as a result of the examination of how efficiently the lubricant is supplied in the invention, it was found that the lower the molecular weight of the lubricant was, the more easily the lubricant was supplied and lubricant the average molecular weight of which was in a range of 900 to 2500 was suitable for lubricant to be supply.

In the following embodiments, examples that lubricant having clearly lower molecular weight (average molecular weight: approximately 2000), compared with that of lubricant applied on a magnetic disc beforehand and shown in the expression (1) is used for lubricant for supply are shown. This lubricant is perfluoropolyether having a hydroxyl group at both ends. For a solvent of lubricant, Nobeck HFE7100 manufactured by 3M is used. In the embodiments, lubricant having a hydroxyl group at the end is used, however, if lubricant the end group shown in the expression (1) of which has polarity is used, the similar effect can be acquired.

Figure 1:
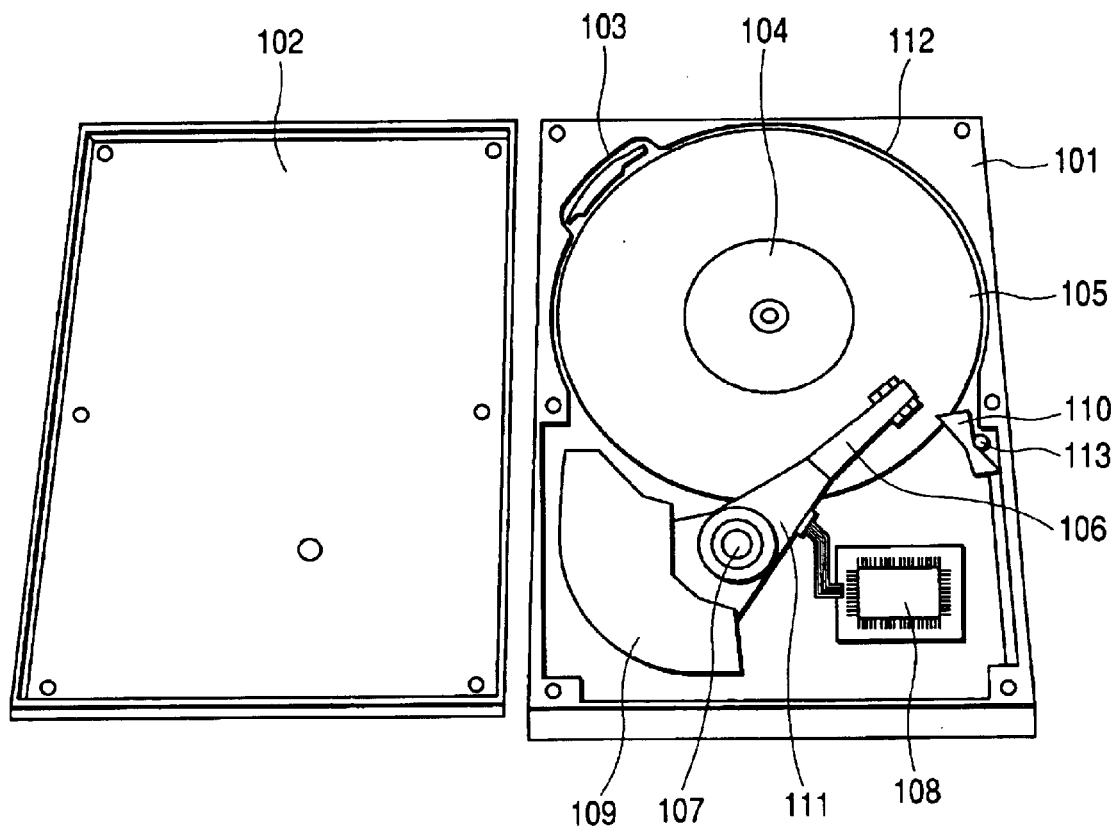
FIG. 1 is a schematic drawing showing a magnetic disc apparatus.

FIG. 1 shows the structure of a magnetic disc apparatus used in the embodiments and an example for comparison.

A magnetic disc 105 is attached to a spindle on a base 101 via a spacer and by a cap 104. A magnetic head 106 is attached to a voice coil motor (VCM) formed by a head assembly 111 including a magnet 109 and a coil via an arm and is built on the base. The head is positioned with a pivot bearing 107 in the center.

A read/write signal to the magnetic head is processed via read/write IC 108. Recently, a ramp 110 for backing the head as a loading/unloading mechanism is also attached to the base. A filter 103 is provided to clean the inside of the magnetic disc apparatus. After these components are built, the base is covered with a base cover 102 and is sealed.

(Embodiment 1)

A magnetic disc apparatus shown in FIG. 1 was operated at the ambient temperature of 24 C.° and the temperature of each component in the apparatus when the elapse of five hours was measured using a thermocouple (Table 1). The operation of the apparatus was performed by the repeating read and write at random seek with the rotational speed of a magnetic disc being 4200 min$^{-1}$ and with the floating height of a head being approximately 10 nm.

According to the result shown in Table 1, it is known in the comparison in surface temperature of each component after five hours from the initiation of the operation that the temperature of read/write IC and a magnet of VCM is higher than that of a base by 10 C.° or more.

TABLE 1

| Operation hours | Component-in-apparatus surface temperature [□] | | |
|---|---|---|---|
| [h] | Read/Write IC | VCM magnet | Base |
| 0 | 23.3 | 23.1 | 23.2 |
| 5 | 50.1 | 42.5 | 30.8 |

To know the effect of lubricant supply to the magnetic disc platter from lubricant applied to a component in the disc apparatus, total three magnetic disc apparatuses in which the above-mentioned lubricant for supply was applied to any of the surface of the read/write IC, the surface of the VCM magnet and the base (in the vicinity of the read/write IC) which were respectively a component-in-magnetic-disc-apparatus were prepared. The application of lubricant was performed by applying 5 wt % solution of lubricant using a sponge marker manually. At this time, no lubricant was applied to the magnetic disc platter mounted in the magnetic disc apparatus.

The operation of the three magnetic disc apparatuses was performed by repeating read and write at random seek with the rotational speed of the magnetic disc 4200 min$^{-1}$ and with the floating height of the head approximately 10 nm for five hours.

Figure 2:
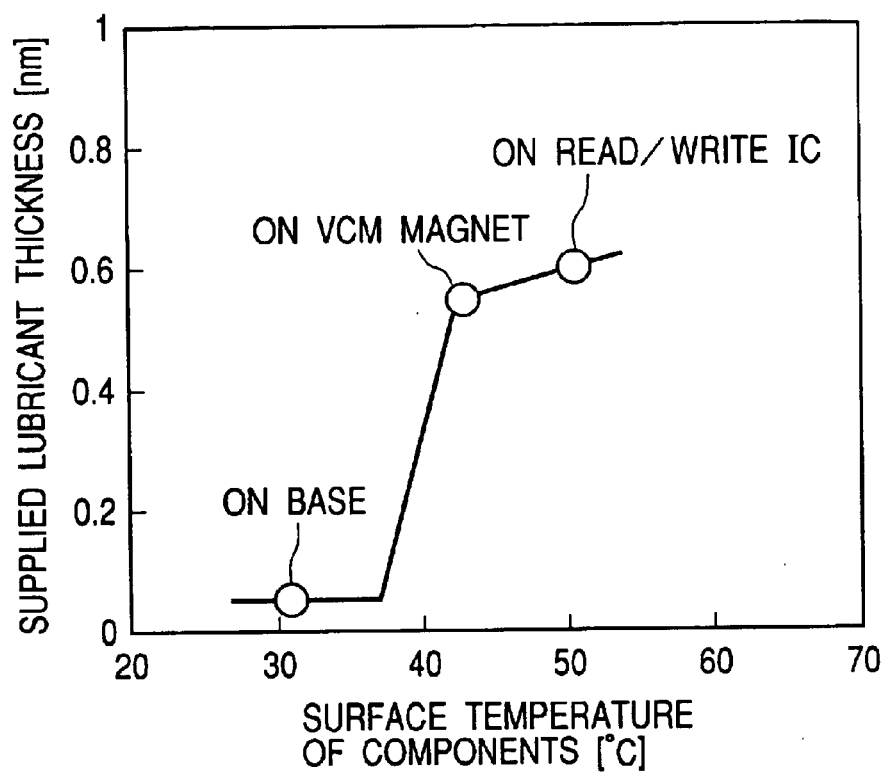
FIG. 2 shows relation between the surface temperature of components in the magnetic disc apparatus to which lubricant for supply according to the invention is applied and the quantity of lubricant supplied to a magnetic disc platter.

The magnetic disc platter was extracted from the magnetic disc apparatus after the operation on the above-mentioned condition and the thickness of lubricant was measured as the quantity of lubricant supplied to the magnetic disc platter. FIG. 2 shows the result together with the component surface temperature shown above.

It is known that from this result that the supply quantity to the magnetic disc platter in case lubricant for supply is applied to the VCM magnet and the read/write IC is extremely more than the supply quantity in case lubricant for supply is applied to the base. Needless to say, it is obvious that in the case of a conventional type in which no lubricant for supply is applied to a component in the magnetic disc apparatus, there is no possibility of such lubricant supply.

The result shows that lubricant can be efficiently supplied to the magnetic disc platter while the apparatus is operated by applying lubricant to the components whose temperature becomes higher than that of the base.

The thickness of lubricant on the magnetic disc platter was measured by a Fourier transform infrared spectrophotometer (FTIR).

The magnetic disc apparatus shown in FIG. 1 was operated on the above-mentioned condition for 1000 hours in a state that lubricant for supply was applied on the surface of the read/write IC, however, it was verified that no problem was caused in a reading/writing system and a driving system.

It is judged based upon the result of this embodiment that if lubricant for supply is applied to a component in the magnetic disc apparatus the surface temperature of which becomes higher than that of the base except the VCM magnet and the read/write IC in operation, the similar effect by high temperature can be acquired. Particularly, in case the surface temperature becomes higher by 10 C.° or more, the effect is remarkable.

(Embodiment 2)

A magnetic disc apparatus in which the above-mentioned lubricant for supply was applied to a shroud (a component located outside a magnetic disc platter when it was viewed from the rotational center and an external wall of the base having the surface perpendicular to the data surface of the magnetic disc platter) of a base which was a component in the magnetic disc apparatus was prepared. The lubricant for supply was applied as in the embodiment 1. No lubricant was applied to the magnetic disc platter mounted in the magnetic disc apparatus.

This magnetic disc apparatus was operated for five hours in a state that read and write at random seek were repeated with the rotational speed of the magnetic disc 4200 $min^{-1}$ and with the floating height of a head approximately 10 nm.

The result of extracting the magnetic disc platter from the magnetic disc apparatus after the operation on the above-mentioned condition and measuring the thickness of the lubricant supplied on the magnetic disc platter as the supplied quantity was 0.5 nm. It is known from the result that in this embodiment, the supply of lubricant to the magnetic disc platter is also achieved in the operation of the apparatus in short time. It is conceivable that as air flows fastest in the apparatus in the vicinity of the outer end of the magnetic disc platter, lubricant for supply easily evaporates and is efficiently supplied.

In the magnetic disc apparatus shown in FIG. 1, lubricant for supply was applied to the shroud of the base and the magnetic disc apparatus was operated on the above-mentioned condition for 1000 hours, however, it was verified that no problem was caused in a reading/writing system and a driving system.

The similar effect can be also acquired by the application of lubricant for supply to a component having the surface perpendicular to the data surface of the magnetic disc platter out of components located outside the magnetic disc platter when it is viewed from the rotational center such as a block E (described on a page 10 of "Advanced storage terminology dictionary" published in Apr. in 2000 and by Nikkei BP) in the apparatus.

(Embodiment 3)

An apparatus was assembled after the solution of lubricant for supply described in the embodiment 1 was manually applied to the surface corresponding to the position of VCM of the cover of the magnetic disc apparatus shown in FIG. 1 using a small brush, a pen and a sponge marker. Also, after the solution was manually applied to a position in which VCM was attached on the base of the apparatus after a stick for cleaning of a type that hardly stirred up dust made of polyurethane was dipped in the solution, the apparatus was assembled. The application of the lubricant for supply was performed in a state in which only a spindle is attached on the base. That is, the application of the lubricant for supply in this embodiment to components in the apparatus can be performed during a normal magnetic disc assembling process and the change of the design of the magnetic disc apparatus is not required. The time required for applying the lubricant is a short time, within a few seconds per apparatus, and the production efficiency of the magnetic disc assembling process is not sacrificed.

A magnetic disc apparatus in which no lubricant for supply was applied to the above-mentioned components was prepared for an example for comparison 1.

In this embodiment, a magnetic disc platter to which lubricant shown in the chemical formula (1) and having the average molecular weight of 2000 is applied by 2.0 nm is mounted in the magnetic disc apparatus.

After the magnetic disc apparatuses respectively produced for this embodiment and the example for comparison 1 were operated at 70 C° for 1000 hours, the thickness of the lubricant on the magnetic disc platters and the contamination of heads were compared. Table 2 shows the result. The rotational speed of the operated magnetic discs was 4200 $min^{-1}$ and the floating height of the heads was approximately 10 nm. The contamination of the heads was observed using a optical microscope. Table 2 also shows the result.

TABLE 2

| | | Result after test | |
|---|---|---|---|
| | Supply lubricant coated location/Method | Lubricant thickness | Head contamination |
| Embodiment 3 | Cover (VCM surface)/Application by small brush | 2.1 nm | None |
| | Cover (VCM surface)/Application by pen | 2.0 nm | None |
| | Cover VCM surface)/Application by sponge marker | 2.0 nm | None |
| | Cover (VCM attachment)/Application by stick | 1.9 nm | None |
| Embodiment 4 | Ramp tapped hole/Microdispenser | 1.8 nm | None |
| | Pivot bearing fixing hole/Microdispenser | 2.1 nm | None |
| Example for comparison 1 | No supply lubricant | 1.3 nm | Found |

In any case of the embodiment 3, it is known that the thickness of a lubricant film (2.0 nm) on the magnetic disc platter before the operation is substantially maintained. The contamination of the heads was not recognized. In the meantime, in the example for comparison 1, the thickness of a lubrication film on the magnetic disc platter was 1.3 nm, decreased than the thickness before the operation by 0.7 nm and the contamination of the head was recognized.

From the above-mentioned result, it can be concluded that the magnetic disc apparatus equivalent to this embodiment is excellent in maintaining the reliability in the long-term operation, compared with the magnetic disc apparatus to a component of which no lubricant for supply is applied in the example for comparison 1.

For a method of applying lubricant for supply, if a method of application such as application by a hand spray and a disperser can be realized at a low price, the similar effect can be acquired.

(Embodiment 4)

As a embodiment 4, a magnetic disc apparatus shown in FIG. 1 in which lubricant for supply was injected into a tapped hole 113 for attaching a ramp after the component was attached to a base, was injected into a tapped hole for fixing a pivot bearing of VCM in a state in which the base is sealed with a cover and afterward, a screw was driven was prepared. The injection of the lubricant for supply was performed by dropping the 50 wt % solution of the lubricant for supply into a 2-microliter tapped hole using a microdispenser.

In this embodiment, as in the embodiment 3, a magnetic disc platter to which lubricant shown in the chemical formula (1) and having the average molecular weight of 2000 was applied by 2.0 nm was mounted in the apparatus.

After the apparatus was operated on the similar operational condition to that in the embodiment 3, the thickness of a lubricant film on the magnetic disc platter and the contamination of a head were observed. The result shows that the thickness of the lubricant film is substantially maintained as in the embodiment 3 as shown in Table 2 and it was verified that the contamination of the head was not recognized.

After lubricant for supply was further manually applied to a VCM mounting position on the base of the magnetic disc apparatus shown in FIG. 1 using a small brush, a pen and a sponge marker, the apparatus was assembled.

(Embodiment 5)

An apparatus (an embodiment 5-1) in which lubricant for supply was manually applied to VCM based upon the magnetic disc apparatus shown in FIG. 1 and an apparatus (an embodiment 5-2) in which lubricant for supply was injected into a tapped hole for attaching a ramp as in the embodiment 4 based upon the magnetic disc apparatus shown in FIG. 1 were prepared.

Figure 3:
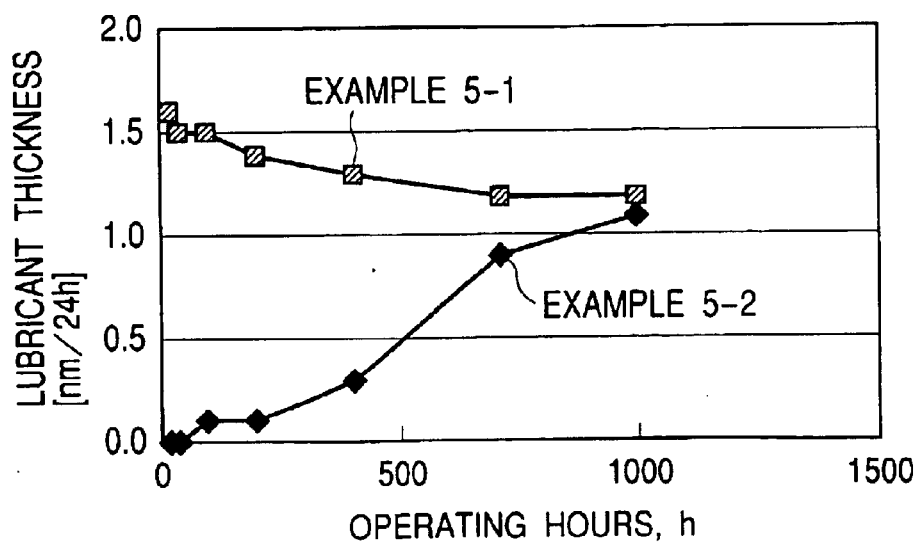
FIG. 3 shows the comparison of time required to supply lubricant for supply according to the invention to the magnetic disc platter.

After the apparatuses were operated on the similar operational condition to that in the third embodiment, a magnetic disc platter to which no lubricant was applied was respectively built and mounted in the magnetic disc apparatuses every elapse up to 1000 hours and the apparatuses were operated for 24 hours, the magnetic disc platters were removed and the thickness of a lubricant film on the magnetic disc platter was respectively measured. FIG. 3 shows the result.

It is known from FIG. 3 that in the embodiment 5-2, timing in which lubricant for supply starts to be supplied and adhere to the magnetic disc platter is later than timing in the embodiment 5-1 and there is delay effect in the supply of lubricant. If delay effects are combined, they are particularly effective in the supply of lubricant in the magnetic disc apparatus requiring long-term apparatus life.

That is, according to the invention, further, in the magnetic disc apparatus provided with a mechanism for supplying lubricant in a state of gas in the magnetic disc apparatus, even if environmental temperature inside the apparatus does not rise, lubricant can be efficiently evaporated by dropping or applying lubricant to a component the temperature while the apparatus is operated of which becomes higher than the temperature of the cover out of components located in the magnetic disc apparatus, concretely to a component in which electric resistance is generated by electrical conduction while the apparatus is operated and the temperature of which inductively rises such as the read/write IC, the voice coil motor (VCM) and further, the periphery of the spindle and can be supplied to the magnetic disc platter or an interface between a head and the disc.

Also, even if environmental temperature in the apparatus does not rise, lubricant can be efficiently evaporated by dropping or applying lubricant to a component located in the vicinity of the outer end of the magnetic disc where relative velocity with air is the fastest in the magnetic disc apparatus and can be supplied to the magnetic disc platter or the interface between the head and the disc.

According to the invention, the low-priced magnetic disc apparatus can be acquired without specially providing a lubricant supply mechanism. The apparatus can be also easily assembled. Further, lubricant can be efficiently supplied from the beginning of the operation of the apparatus. Therefore, the magnetic disc apparatus the reliability of which is high can be provided.

What is claimed is:

1. A magnetic disc apparatus having a lubricant source, comprising:
    a base cover;
    a magnetic disc platter;
    a spindle which secures said magnetic disc platter rotatably;
    a head assembly having an arm coupled with a read/write IC and a voice coil motor including a magnet and a coil;
    a magnetic head which is secured by said arm; and
    a base which secures said spindle and said head assembly,
    wherein a temperature of an inner portion of said magnetic disc apparatus, while the magnetic disc apparatus is operated, is higher than that of said base cover or said base, the inner portion being coated with a lubricant having an average molecular weight from 900 to 2500.

2. A magnetic disc apparatus according to claim 1, wherein:
    the temperature of said inner portion is higher than the temperature of said base cover or said base by 10 C.° or more.

3. A magnetic disc apparatus according to claim 1, wherein:
    said inner portion is a read/write IC or said magnet of said voice coil motor.

4. A magnetic disc apparatus according to claim 1, wherein:
    said lubricant is perfluoropolyether lubricant shown by the following chemical formula:

    $CH_2OH—CF_2(OCF_2CF_2)m- (OCF_2)n- CH_2OH$, where, m and n are natural numbers.

5. A magnetic disk apparatus according to claim 1, wherein the lubricant is supplied via a tapped hole provided for attaching the base cover and the base.

6. A magnetic disc apparatus having a lubricant source, comprising:
    a base cover;
    a magnetic disc platter;
    a shroud located outside said magnetic disc platter;
    a spindle which secures said magnetic disc platter rotatably;
    a head assembly having an arm coupled with a read/write IC and a voice coil motor including a magnet and a coil;
    a magnetic head which is secured by said arm; and
    a base which secures said spindle and said head assembly; and
    wherein a temperature of an inner portion of said magnetic disc apparatus is higher than said base cover or said base, the inner portion being coated with a lubricant having an average molecular weight from 900 to 2500.

7. A magnetic disc apparatus according to claim 6, wherein the temperature of said inner portion is higher than the temperature of said base cover or said base by 10 C.° or more while the magnetic disc apparatus is operated.

8. A magnetic disc apparatus according to claim 6, wherein said inner portion is a read/write IC, said magnet of said voice coil motor or said shroud.

9. A magnetic disc apparatus according to claim 6, wherein:
    said lubricant is perfluoropolyether lubricant shown by the following chemical formula:

    $CH_2OH—CF_2(OCF_2CF_2)m- (OCF_2)n- CH_2OH$, where, m and n are natural numbers.

10. A magnetic disk apparatus according to claim 6, wherein the lubricant is supplied via a tapped hole provided for attaching the base cover and the base.

11. A magnetic disc apparatus having a lubricant source, comprising:
    a base cover;
    a magnetic disc platter;
    a spindle which secures said magnetic disc platter rotatably;
    a head assembly having an arm coupled with a read/write IC and a voice coil motor including a magnet and a coil;

a magnetic head which is secured by said arm; and a base which secures said spindle and said head assembly, wherein said magnetic disc apparatus defines an inner portion with components and wherein said spindle, said head assembly or components in said inner portion are higher in temperature than said base cover or said base, the inner portion being coated with a lubricant having an average molecular weight from 900 to 2500.

12. A magnetic disc apparatus according to claim 11, wherein:

said lubricant is perfluoropolyether lubricant shown by the following chemical formula:

$$CH_2OH\text{---}CF_2(OCF_2CF_2)m\text{-}(OCF_2)n\text{-}CH_2OH,$$

where, m and n are natural numbers.

13. A magnetic disk apparatus according to claim 11, wherein the lubricant is supplied via a tapped hole provided for attaching the base cover and the base.

* * * * *